(12) United States Patent
Jin et al.

(10) Patent No.: US 12,158,360 B2
(45) Date of Patent: Dec. 3, 2024

(54) CAPILLARY CHANNEL ENVIRONMENTAL SENSOR AND PREPARATION METHOD THEREFOR

(71) Applicant: MultiDimension Technology Co., Ltd., Zhangjiagang (CN)

(72) Inventors: Insik Jin, Zhangjiagang (CN); Bin Qi, Zhangjiagang (CN); Songsheng Xue, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 16 days.

(21) Appl. No.: 17/996,424

(22) PCT Filed: Apr. 15, 2021

(86) PCT No.: PCT/CN2021/087542
§ 371 (c)(1),
(2) Date: Oct. 17, 2022

(87) PCT Pub. No.: WO2021/209011
PCT Pub. Date: Oct. 21, 2021

(65) Prior Publication Data
US 2023/0314177 A1    Oct. 5, 2023

(30) Foreign Application Priority Data

Apr. 17, 2020  (CN) .......................... 202010305616.5

(51) Int. Cl.
*G01D 5/16*  (2006.01)
(52) U.S. Cl.
CPC ...................... *G01D 5/16* (2013.01)
(58) Field of Classification Search
CPC ...... G01D 5/12; G01D 5/14–147; G01D 5/16; G01R 33/02; G01R 33/06–098;
(Continued)

(56) References Cited

U.S. PATENT DOCUMENTS 8,906,702 B2 * 12/2014 Zahn ................. B01L 3/502776
                                                    436/526
11,061,084 B2 * 7/2021 Cadugan ............... G01L 13/025
(Continued)

FOREIGN PATENT DOCUMENTS

CN         202008416 U    10/2011
CN         202853815 U     4/2013
(Continued)

OTHER PUBLICATIONS

"Chinese Application No. 202010305616.5, First Office Action dated Sep. 16, 2021", (Sep. 16, 2021), 13 pgs.
(Continued)

*Primary Examiner* — Huy Q Phan
*Assistant Examiner* — David B Frederiksen
(74) *Attorney, Agent, or Firm* — Schwegman Lundberg & Woessner, P.A.

(57) ABSTRACT

Disclosed in the present invention are a capillary channel environmental sensor and a preparation method therefor. The capillary channel environmental sensor comprises a transfer cavity and at least one capillary channel. The cross sectional area of the transfer cavity is greater than the cross sectional area of the capillary channel, and one end of the capillary channel is connected with the transfer cavity; an elastic transfer diaphragm is provided between the transfer cavity and an external measurement environment. A positioned droplet is provided in the interior of the capillary channel, the positioned droplet is in tight contact with the inner walls of the capillary channel and the positioned droplet is in tight contact with a transfer medium. By means of the transfer cavity and the capillary channel that are connected to one another, because the cross sectional area of the transfer cavity is larger than the cross sectional area of the capillary channel, differences in volume between the (Continued)

transfer cavity and the capillary channel are used to transform a small displacement in a region of large volume into a large displacement in a region of small volume. Because the positioned droplet is provided in the capillary channel, and the capillary channel environmental sensor comprises a magnetic sensing element, the magnetic sensing element causes, on the basis of movement of the positioned droplet, the change in displacement through an intermediate variable to provide high-sensitivity and low-power detection.

14 Claims, 7 Drawing Sheets

(58) Field of Classification Search
CPC ........ G01H 11/02; G01H 11/04; G01L 19/14; G01L 9/007
See application file for complete search history.

(56) References Cited

U.S. PATENT DOCUMENTS

| | | | |
|---|---|---|---|
| 2007/0170528 A1 | 7/2007 | Partridge et al. | |
| 2007/0209437 A1* | 9/2007 | Xue | G01L 9/007 73/514.31 |
| 2008/0124779 A1* | 5/2008 | Oh | B03C 1/32 435/308.1 |
| 2010/0303687 A1* | 12/2010 | Blaga | F16K 99/0015 156/247 |
| 2011/0126632 A1 | 6/2011 | McNeil et al. | |
| 2011/0139060 A1 | 6/2011 | Sheau-Shi et al. | |
| 2011/0232388 A1* | 9/2011 | Butterfield | G01L 9/007 73/705 |
| 2012/0032283 A1* | 2/2012 | Frey | G01R 33/0286 257/467 |
| 2014/0070337 A1 | 3/2014 | Besling et al. | |

FOREIGN PATENT DOCUMENTS

| | | | | |
|---|---|---|---|---|
| CN | 202853817 U | | 4/2013 | |
| CN | 104964786 A | * | 10/2015 | |
| CN | 107796293 A | | 3/2018 | |
| CN | 108168740 A | | 6/2018 | |
| CN | 109883456 A | | 6/2019 | |
| CN | 110220636 A | * | 9/2019 | ........... G01L 13/026 |
| CN | 111473806 A | | 7/2020 | |
| WO | WO-2021209011 A1 | | 10/2021 | |

OTHER PUBLICATIONS

"Chinese Application No. 202010305616.5, First Search dated Sep. 8, 2021", (Sep. 8, 2021), 2 pgs.

"Chinese Application No. 202010305616.5, Notification to Grant Patent Right for Invention issued Mar. 2, 2022", (Mar. 2, 2022), 3 pgs.

"International Application No. PCT/CN2021/087542, International Search Report and Written Opinion mailed Jun. 28, 2021", (Jun. 28, 2021), 10 pgs.

* cited by examiner

CAPILLARY CHANNEL ENVIRONMENTAL SENSOR AND PREPARATION METHOD THEREFOR

PRIORITY CLAIM TO RELATED APPLICATIONS

This application is a U.S. national stage filing under 35 U.S.C. § 371 from International Application No. PCT/CN2021/087542, filed on 15 Apr. 2021, and published as WO2021/209011 on 21 Oct. 2021, which claims the benefit under 35 U.S.C. 119 to Chinese Application No. 202010305616.5, filed on 17 Apr. 2020, the benefit of priority of each of which is claimed herein.

TECHNICAL FIELD

Embodiments of the present invention relate to the technical field of environmental parameter detection sensors, and in particular to a capillary channel environmental sensor and a preparation method therefor.

BACKGROUND

At present, environmental sensors include temperature sensors, pressure sensors, displacement sensors, vibration sensors, microphones, and a series of other subdivisions. There are significant differences in chip design, materials, processes, and packaging structures in these subdivisions, making it difficult to integrate multiple different types of environmental sensors or resulting in a complex integration process. In addition, chips of the pressure sensors, displacement sensors, vibration sensors, microphones, and other sensors are difficult to combine the requirements of a high SNR and low power consumption.

SUMMARY OF THE INVENTION

In view of this, embodiments of the present invention provide a capillary channel environmental sensor and a preparation method therefor. Based on Pascal's principle, by means of a size difference between a transfer cavity and a capillary channel, a small displacement in a region of large volume is transformed into a large displacement in a region of small volume. A multivariate and high-sensitivity material is equipped as a magnetic sensing element to convert a change in displacement into a change in resistance value through an intermediate variable, such as the magnetic field variation. Moreover, by means of the characteristics of high sensitivity and low power consumption of the magnetic sensing element, single-chip manufacturing of environmental parameter sensors, such as the ambient temperature sensor, pressure sensor, displacement sensor, vibration sensor and acoustic wave sensor, can be implemented in the same process, facilitating integration and miniaturization of the environmental sensor and further ensuring high SNR and low power consumption of the sensor.

In a first aspect, an embodiment of the present invention provides a capillary channel environmental sensor, which includes a transfer substrate and at least one magnetic sensing element, where a transfer cavity and at least one capillary channel are provided inside the transfer substrate, the cross sectional area of the transfer cavity being greater than the cross sectional area of the capillary channel, and one end of the capillary channel being connected with the transfer cavity;

an elastic transfer diaphragm is provided between the transfer cavity and an external measurement environment, and a transfer medium is provided inside the transfer cavity; and a positioned droplet is provided in the interior of the capillary channel, the positioned droplet is in tight contact with the inner walls of the capillary channel and the positioned droplet is further in tight contact with the transfer medium.

In some embodiments, the minimum distance from the magnetic sensing element to the capillary channel is less than the minimum distance from the magnetic sensing element to the elastic transfer diaphragm.

In some embodiments, the capillary channel environmental sensor further includes a signal transformation material, at least part of the signal transformation material being disposed in the transfer medium or the signal transformation material being disposed in the positioned droplet; and the positioned droplet includes mercury, a magnetic fluid, or a hydrophobic organic liquid that can generate an induced magnetic field based on the flow of the positioned droplet.

In some embodiments, the signal transformation material comprises a magnetic material that is disposed in the transfer medium or in the positioned droplet; or the signal transformation material includes a non-magnetic metal material and an excitation coil, the non-magnetic metal material being disposed in the transfer medium or in the positioned droplet, and the excitation coil being disposed on the transfer substrate; and the excitation coil is loaded with a radio frequency AC current, which is used to drive the non-magnetic metal material to generate an induced eddy current, thus resulting in an induced magnetic field.

In some embodiments, one end of the capillary channel that is communicated with the external measurement environment is closed.

In some embodiments, the magnetic sensing element includes one of anisotropic magnetoresistance, giant magnetoresistance, tunnel junction magnetoresistance, and Hall elements.

In some embodiments, the capillary channel environmental sensor further includes: a connecting lead and a contact electrode that are located at a first side of the magnetic sensing element, and a passivation layer located at a second side of the magnetic sensing element, the first side and the second side being disposed opposite to each other; and the connecting lead and the magnetic sensing element are electrically connected, and the contact electrode and the connecting lead are electrically connected.

In some embodiments, the surface of one side of the elastic transfer diaphragm away from the transfer cavity is provided with a rigid covering.

In some embodiments, an evacuated enclosure is disposed at one side of the elastic transfer diaphragm away from the transfer cavity, the evacuated enclosure and the elastic transfer diaphragm forming a closed cavity, the closed cavity being a vacuum-sealed cavity or a sealed cavity with a known reference pressure; and a mass block is disposed in the closed cavity, the mass block being located on the surface of the elastic transfer diaphragm; or the closed cavity is filled with a counterweight liquid.

In a second aspect, an embodiment of the present invention further provides a preparation method of a capillary channel environmental sensor, for use in preparing the capillary channel environmental sensor described in the first aspect, where the preparation method includes:

selecting a transfer substrate, and growing an elastic transfer diaphragm on a first surface of the transfer substrate;

preparing a transfer cavity and at least one capillary channel in the transfer substrate, where the cross sectional area of the transfer cavity is greater than the cross sectional area of the capillary channel, and one end of the capillary channel is connected with the transfer cavity;

injecting a transfer medium into the transfer cavity, and injecting a positioned droplet into the capillary channel, where the positioned droplet is in tight contact with the inner walls of the capillary channel and the positioned droplet is further in tight contact with the transfer medium; and preparing a magnetic sensing element.

In some embodiments, the step of preparing a transfer cavity and at least one capillary channel in the transfer substrate includes:

etching the elastic transfer diaphragm and the transfer substrate to prepare at least one capillary channel, where the depth of the capillary channel is greater than the thickness of the elastic transfer diaphragm; and etching a second surface of the transfer substrate to obtain a transfer cavity, where the transfer cavity penetrates through the transfer substrate and the transfer cavity is connected with the capillary channel; and the second surface is disposed opposite to the first surface.

In some embodiments, the step of preparing a magnetic sensing element includes:

selecting a carrying substrate and preparing at least one magnetic sensing element on the surface of the carrying substrate; and bonding the carrying substrate and the transfer substrate in such a manner that the magnetic sensing element faces the transfer substrate; and the preparation method further includes:

removing the carrying substrate from the surface of the transfer diaphragm by etching.

In some embodiments, the step of preparing at least one magnetic sensing element on the surface of the carrying substrate includes:

depositing an induction material film on the surface of the carrying substrate, and forming a magnetic sensing element and a connecting lead by photolithography; and preparing a passivation layer at one side of the magnetic sensing element away from the carrying substrate; and after the step of preparing at least one magnetic sensing element on the surface of the carrying substrate, the method further includes:

thinning the carrying substrate from one side away from the transfer substrate and etching the carrying substrate till a part of the connecting lead is exposed, and depositing a metal material on the exposed part of the connecting lead to form a contact electrode.

In some embodiments, the step of injecting a transfer medium into the transfer cavity includes:

selecting an auxiliary wafer;

bonding the auxiliary wafer to the second surface of the transfer substrate to obtain the transfer cavity, where the second surface is disposed opposite to the first surface; and injecting the transfer medium into the transfer cavity.

In the capillary channel environmental sensor and the preparation method therefor provided by the embodiments of the present invention, the mutually communicated transfer cavity and capillary channel are provided in the transfer substrate, and further the cross sectional area of the transfer cavity is set to be larger than that of the capillary channel. Thus, based on Pascal's principle and by means of the difference in volume between the transfer cavity and the capillary channel, a small displacement in a region of large volume is transformed into a large displacement in a region of small volume, and the large displacement can be conducted to the capillary channel. Moreover, the positioned droplet is provided in the capillary channel, and the capillary channel environmental sensor further includes a magnetic sensing element. In this way, based on the movement of the positioned droplet, a change in displacement can be converted into a change in resistance value through an intermediate variable, such as the magnetic field variation. Thus, by means of the characteristics of high sensitivity and low power consumption of the magnetic sensing element, single-chip manufacturing of environmental parameter sensors, such as the ambient temperature sensor, pressure sensor, displacement sensor, vibration sensor and acoustic wave sensor, can be implemented in the same process, facilitating integration and miniaturization of the environmental sensor and further ensuring high SNR and low power consumption of the sensor.

BRIEF DESCRIPTION OF THE DRAWINGS

Other features, objectives and advantages of the present invention will become more apparent upon reading the detailed description of non-restrictive embodiments made with reference to the following accompanying drawings.

DETAILED DESCRIPTION

To make the objectives, technical solutions, and advantages of the present invention clearer, the technical solutions of the present invention are clearly and completely described below by using specific implementations and with reference to the accompanying drawings in the embodiments of the present invention. Apparently, the described embodiments are some rather than all of the embodiments of the present invention. Based on the described embodiments of the present invention, other embodiments acquired by those of ordinary skill in the art without creative effort all belong to the protection scope of the present invention.

Figure 1:
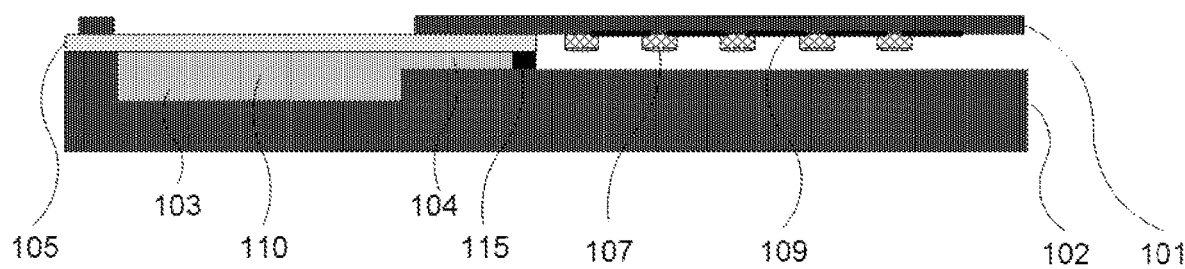
FIG. 1 is a schematic structural sectional diagram of a capillary channel environmental sensor provided by an embodiment of the present invention.
Figure 2:
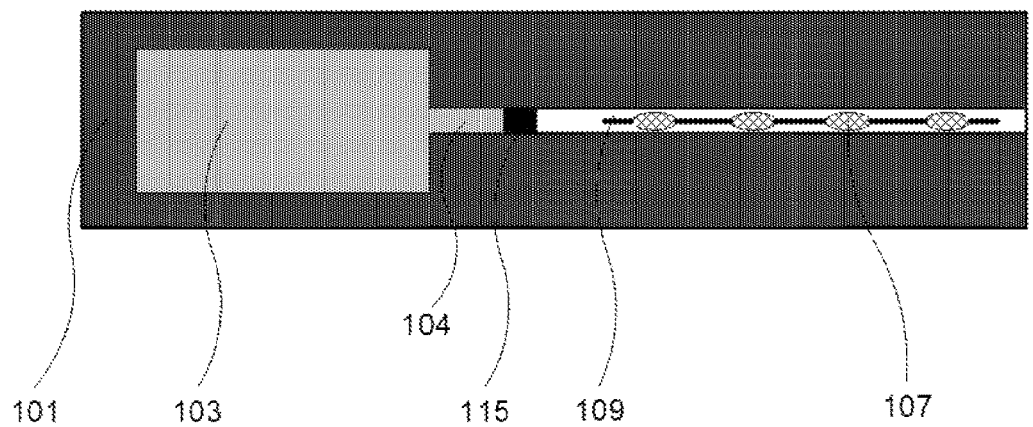
FIG. 2 is a schematic structural top view of the capillary channel environmental sensor provided by an embodiment of the present invention.

FIG. 1 is a schematic structural sectional diagram of a capillary channel environmental sensor provided by an embodiment of the present invention; and FIG. 2 is a schematic structural top view of the capillary channel environmental sensor provided by an embodiment of the present invention. As shown in FIGS. 1 and 2, the capillary channel environmental sensor 10 provided by the embodiment of the present invention includes a transfer substrate 102 and at least one magnetic sensing element 107. A transfer cavity 103 and at least one capillary channel 104 are provided inside the transfer substrate 102, where the cross sectional area of the transfer cavity 103 is greater than the cross sectional area of the capillary channel 104, and one end of the capillary channel 104 is connected with the transfer cavity 103. An elastic transfer diaphragm 105 is provided between the transfer cavity 103 and an external measurement environment, and a transfer medium is provided inside the transfer cavity 103. A positioned droplet 115 is provided in the interior of the capillary channel 104, where the positioned droplet 115 is in tight contact with the inner walls of the capillary channel 104 and the positioned droplet is further in tight contact with the transfer medium.

Exemplarily, as shown in FIGS. 1 and 2, the transfer cavity 103 and the capillary channel 104 that are mutually connected are formed in the transfer substrate 102, and the cross sectional area of the transfer cavity 103 is greater than that of the capillary channel 104. Further, the elastic transfer diaphragm 105 is provided between the transfer cavity 103 and the external measurement environment, and the transfer cavity 103 is internally filled with the transfer medium (not shown in the figures), where the transfer medium is a liquid or gas capable of force transmission and may be air herein. The positioned droplet 115 is provided in the interior of the capillary channel 104, where the positioned droplet 115 is in tight contact with the inner walls of the capillary channel 104 and the positioned droplet 115 is further in tight contact with the transfer medium. When the external ambient pressure or vibration acts on the exterior surface of the elastic transfer diaphragm 105, the force is transmitted through the transfer medium into the capillary channel 104 with a small cross sectional area. According to Pascal's principle, and by means of the great difference between the cross sectional areas of the transfer cavity 103 and the capillary channel 104, a small displacement in a large area is transformed into a large displacement in a small area, thus amplifying the changes in the external environment.

Further, the capillary channel environmental sensor 10 includes a magnetic sensing element 107. Thus, a significant displacement in the capillary channel 104 drives the positioned droplet 115 to move, leading to changes in position and magnetic field of the magnetic sensing element 107. The magnetic sensing element 107 may be a high-sensitivity magnetoresistive element. In this way, a change in displacement is converted into a change in resistance value through an intermediate variable, such as the magnetic field variation, such that the external pressure, vibration or acoustic signal can be accurately measured. Moreover, by means of the characteristics of high sensitivity and low power consumption of the magnetic sensing element, single-chip manufacturing of environmental parameter sensors, such as the pressure sensor, displacement sensor, vibration sensor and acoustic wave sensor, can be implemented in the same process, facilitating integration and miniaturization of the micromotor environmental sensor and conforming to the development trend of the capillary channel environmental sensor.

Alternatively, the positioned droplet 115 may be one of mercury, a magnetic fluid, and a hydrophobic organic liquid.

It should be noted that, the capillary channel environmental sensor 10 provided by the embodiment of the present invention may include one or more capillary channels 104. FIGS. 1 and 2 illustrates an example in which the capillary channel environmental sensor 10 includes only one capillary channel 104, and the embodiment of the present invention does not limit a specific number of the capillary channels 104.

It should be further noted that, in FIG. 2, in order to illustrate the communication between the transfer cavity 103 and the capillary channel 104 in detail, FIG. 2 does not show the elastic transfer diaphragm 105, but directly shows the internal structures of the transfer cavity 103 and the capillary channel 104 in the transfer substrate 102.

To sum up, in the capillary channel environmental sensor provided by the embodiment of the present invention, the mutually communicated transfer cavity and capillary channel are provided in the transfer substrate, and further the cross sectional area of the transfer cavity is set to be larger than that of the capillary channel. Thus, based on Pascal's principle and by means of the difference in volume between the transfer cavity and the capillary channel, a small displacement in a region of large volume is transformed into a large displacement in a region of small volume. Moreover, the positioned droplet is provided in the capillary channel, and the capillary channel environmental sensor further includes a magnetic sensing element. In this way, based on the movement of the positioned droplet, a change in displacement can be converted into a change in resistance value through an intermediate variable, such as the magnetic field variation. Thus, by means of the characteristics of high sensitivity and low power consumption of the magnetic sensing element, single-chip manufacturing of environmental parameter sensors, such as the pressure sensor, displacement sensor, vibration sensor and acoustic wave sensor, can be implemented in the same process, facilitating integration and miniaturization of the environmental sensor and further ensuring high SNR and low power consumption of the sensor.

As a feasible implementation, the capillary channel environmental sensor 10 may further include a signal transformation material, where at least part of the signal transformation material is disposed in the transfer medium or the signal transformation material is disposed in the positioned droplet 115. The positioned droplet includes mercury, a magnetic fluid, or a hydrophobic organic liquid that can generate an induced magnetic field based on the flow of the positioned droplet. Specifically, the signal transformation material provided by the embodiment of the present invention may be a magnetic material with high magnetic permeability or large remanence. By additional disposition of the signal transformation material, the magnitude of change of the intermediate variable can be increased, thereby improving the sensitivity of the capillary channel environmental sensor.

The signal transformation material in the embodiment of the present invention can be arranged in many manners, and a specific arrangement manner of the signal transformation material is described below.

Continuously referring to FIGS. 1 and 2, the signal transformation material may include a magnetic material 110 which is disposed in the transfer medium. As shown in FIGS. 1 and 2, the deformation of the elastic transfer diaphragm 105 causes the displacement of the magnetic material 110, such that the magnetic field at the magnetic sensing element 107 changes correspondingly, thus obtaining environmental change parameters. Alternatively, the magnetic material 110 may be a magnetic metal material or a magnetic non-metal material, which is not limited in the embodiment of the present invention. Further, the magnetic material 110 may be uniformly dispersed in the transfer medium in the form of particles or in other forms. For example, the magnetic material is disposed in the transfer medium in the form of a magnetic membrane. The embodiment of the present invention does not limit the arrangement manner of the magnetic material 110, and FIGS. 1 and 2 illustrates an example in which the magnetic material 110 is uniformly dispersed in the transfer medium in the form of particles.

Figure 3:
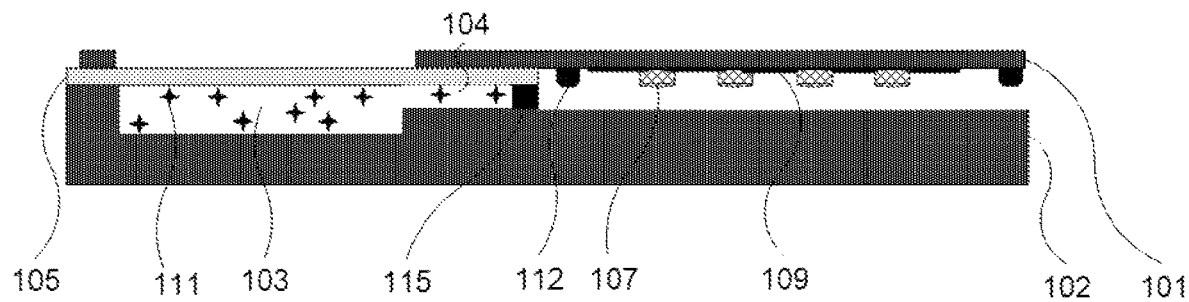
FIG. 3 is a schematic structural sectional diagram of another capillary channel environmental sensor provided by an embodiment of the present invention.
Figure 4:
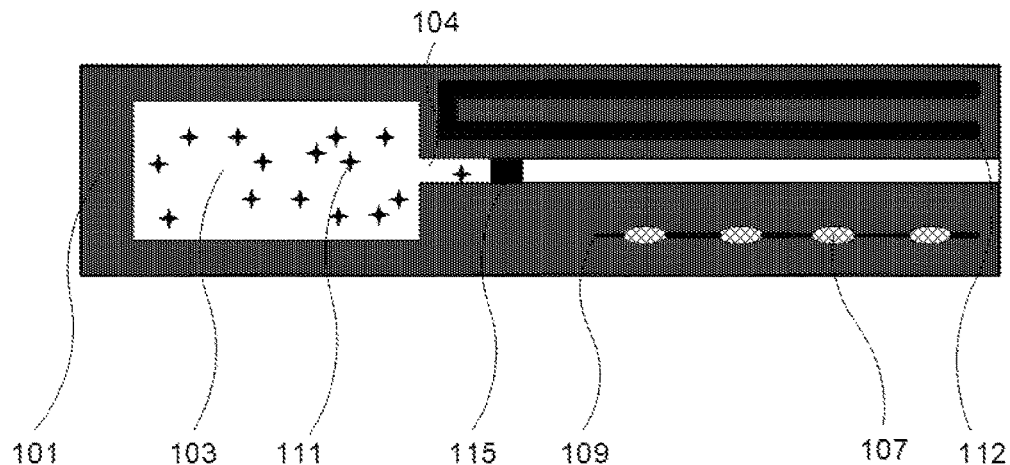
FIG. 4 is a schematic structural top view of another capillary channel environmental sensor provided by an embodiment of the present invention.

FIG. 3 is a schematic structural sectional diagram of another capillary channel environmental sensor provided by an embodiment of the present invention; and FIG. 4 is a schematic structural top view of another capillary channel environmental sensor provided by an embodiment of the present invention. As shown in FIGS. 3 and 4, the signal transformation material includes a non-magnetic metal material 111 and an excitation coil 112. The non-magnetic metal material 111 is disposed in the transfer medium, and the excitation coil 112 is disposed on the transfer substrate 102. The excitation coil 106 is loaded with a radio frequency AC current, which is used to drive the non-magnetic metal material 111 to generate an induced eddy current, thus resulting in an induced magnetic field. FIG. 3 illustrates an example in which the excitation coil 112 is disposed in the capillary channel 104, and FIG. 4 illustrates an example in which the excitation coil 112 is disposed out of the capillary channel 104. As shown in FIGS. 3 and 4, by loading a radio frequency AC current in the excitation coil 112, the non-magnetic metal particles 111 produce an induced eddy current, thus resulting in an induced magnetic field. Then, by the displacement of the non-magnetic metal particles 111, the magnetic field at the magnetic sensing element 107 correspondingly changes, thus obtaining environmental change parameters. Alternatively, the non-magnetic metal material 111 may be uniformly dispersed in the transfer medium in the form of particles or in other forms. For example, the non-magnetic metal material is disposed in the transfer medium in the form of a non-magnetic membrane. The embodiment of the present invention does not limit the arrangement manner of the non-magnetic metal material 111, and FIGS. 3 and 4 give description only by using an example in which the non-magnetic metal material 111 is uniformly dispersed in the transfer medium in the form of particles.

Figure 5:
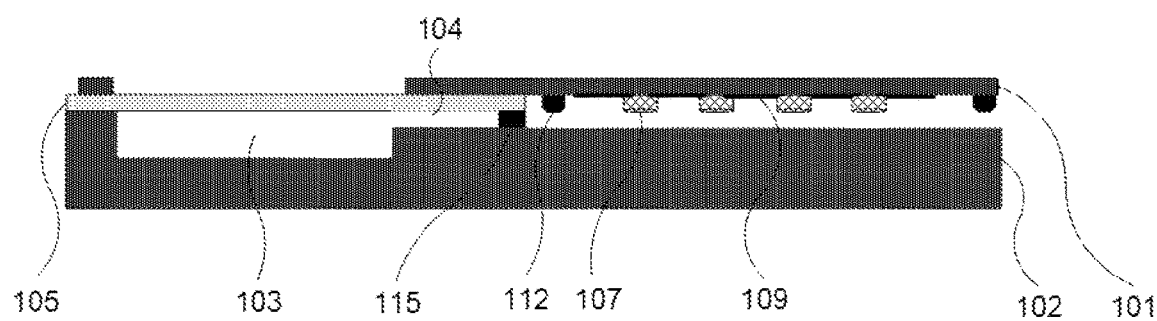
FIG. 5 is a schematic structural sectional diagram of another capillary channel environmental sensor provided by an embodiment of the present invention.

FIG. 5 is a schematic structural sectional diagram of another capillary channel environmental sensor provided by an embodiment of the present invention. As shown in FIG. 5, the signal transformation material is disposed in the positioned droplet 115 and the excitation coil 112 is disposed on the transfer substrate 102. The excitation coil 106 is loaded with a radio frequency AC current, which is used to drive the non-magnetic metal material 111 to generate an induced eddy current, resulting in an induced magnetic field. The positioned droplet 115 includes mercury, a magnetic fluid, or a hydrophobic organic liquid that can generate an induced magnetic field based on the flow of the positioned droplet 115. By loading a radio frequency AC current in the excitation coil 112, the positioned droplet 115 produces an induced eddy current, thus resulting in an induced magnetic field. Then, by the displacement of the positioned droplet 115, the magnetic field at the magnetic sensing element 107 correspondingly changes, thus obtaining environmental change parameters.

Different arrangement manners of the signal transformation material are described in detail above. The embodiment of the present invention does not limit the specific arrangement manner of the signal transformation material, and it is only necessary to ensure that the magnitude of change of the intermediate variable can be increased by additional disposition of the signal transformation material, thereby improving the sensitivity of the capillary channel environmental sensor.

As a feasible implementation, the magnetic sensing element 107 may include one of anisotropic magnetoresistance, giant magnetoresistance, tunnel junction magnetoresistance, and Hall elements. By providing the magnetic sensing element 107 as a high-sensitivity magnetoresistive element, the micromotor environmental sensor can accurately measure the external ambient temperature, pressure, vibration or acoustic signals. Continuously referring to FIG. 1, the magnetic sensing element 107 is disposed on a carrying substrate 101.

As a feasible implementation, continuously referring to FIGS. 1 and 2, the minimum distance from the magnetic sensing element 107 to the capillary channel 104 is less than the minimum distance from the magnetic sensing element 107 to the elastic transfer diaphragm 105, thus ensuring that each magnetic sensing element 107 can sense the movement of the positioned droplet in the capillary channel 104, guaranteeing that the signal sensed by the magnetic sensing element 107 has a relatively large change, and improving the sensing sensitivity of the micromotor environmental sensor.

Further, the embodiment of the present invention does not limit the arrangement position of the magnetic sensing element 107. As shown in FIGS. 1, 2, 3, and 5, the magnetic sensing element 107 may be disposed in the capillary channel 104. Alternatively, as shown in FIG. 4, the magnetic sensing element 107 may be disposed out of the capillary channel 104, and it is only required to ensure that the magnetic sensing element 107 can sense the change in the external environment.

Figure 6:
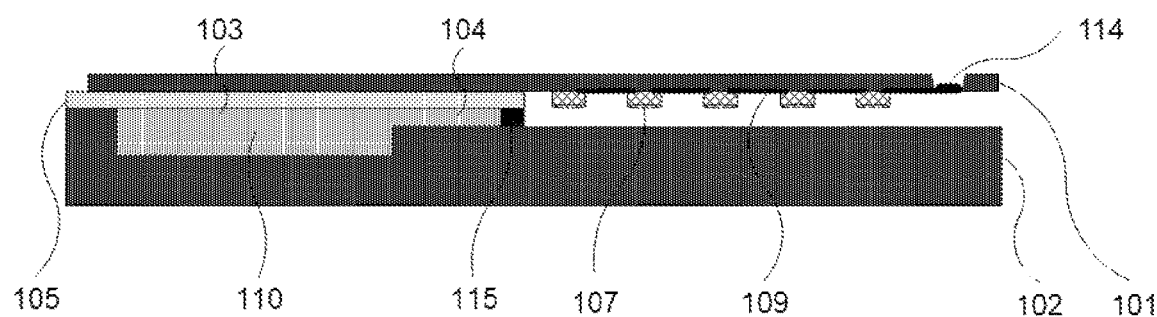
FIG. 6 is a schematic structural sectional diagram of another capillary channel environmental sensor provided by an embodiment of the present invention.

As a feasible implementation, FIG. 6 is a schematic structural sectional diagram of another capillary channel environmental sensor provided by an embodiment of the present invention. As shown in FIGS. 1 to 6 in combination, the capillary channel environmental sensor 10 provided by the embodiment of the present invention may further include: a connecting lead 109 and a contact electrode 114 that are located at a first side of the magnetic sensing element 107, and a passivation layer (not shown in the figures) located at a second side of the magnetic sensing element 107. The first side and the second side are disposed opposite to each other. The connecting lead 109 and the magnetic sensing element 107 are electrically connected, and the contact electrode 114 and the connecting lead 09 are electrically connected. As shown in FIGS. 1 to 6, the magnetic sensing element 107 transmits a signal to the contact electrode 114 through the connecting lead 109, such that the signal sensed by the magnetic sensing element 107 can be timely and normally transmitted, thus ensuring that the capillary channel environmental sensor senses the environmental parameters such as the external pressure, displacement, vibration and acoustic signals and guaranteeing normal operation of the capillary channel environmental sensor. Further, by disposing the passivation layer on the second side of the magnetic sensing element 107, packaging and protection for the magnetic sensing element 107 can be enhanced by means of the passivation layer, thus prolonging the service life of the magnetic sensing element 107 and further prolonging the service life of the capillary channel environmental sensor.

Figure 7:
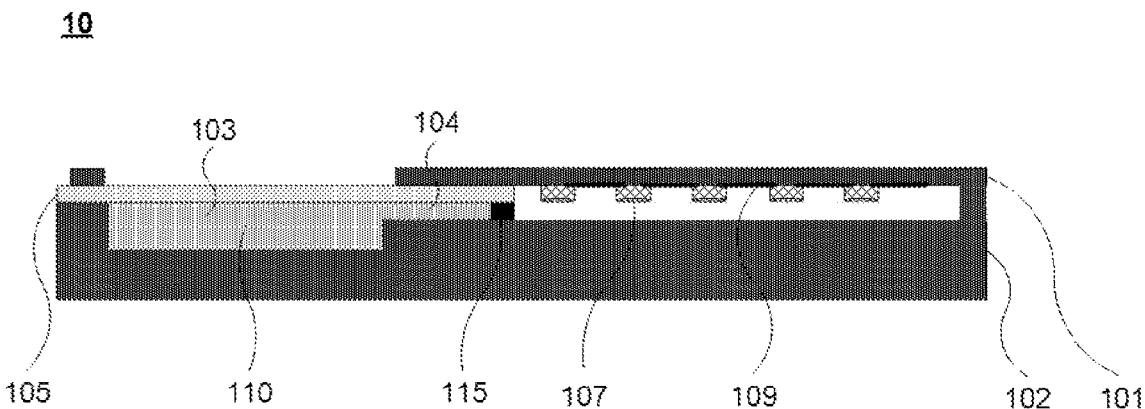
FIG. 7 is a schematic structural sectional diagram of another capillary channel environmental sensor provided by an embodiment of the present invention.

As a feasible implementation, FIG. 7 is a schematic structural sectional diagram of another capillary channel environmental sensor provided by an embodiment of the present invention. As shown in FIG. 7, in the capillary channel environmental sensor 10, one end of the capillary channel 104 that is communicated with the measurement environment is closed. In this way, the movement of the positioned droplet 115 is only based on the change in the external environment sensed at one side of the elastic transfer diaphragm 105, thus ensuring high sensitivity of sensing of the change in the external environment and further avoiding interference with the measurement caused by contaminants entering the capillary channel.

Figure 8:
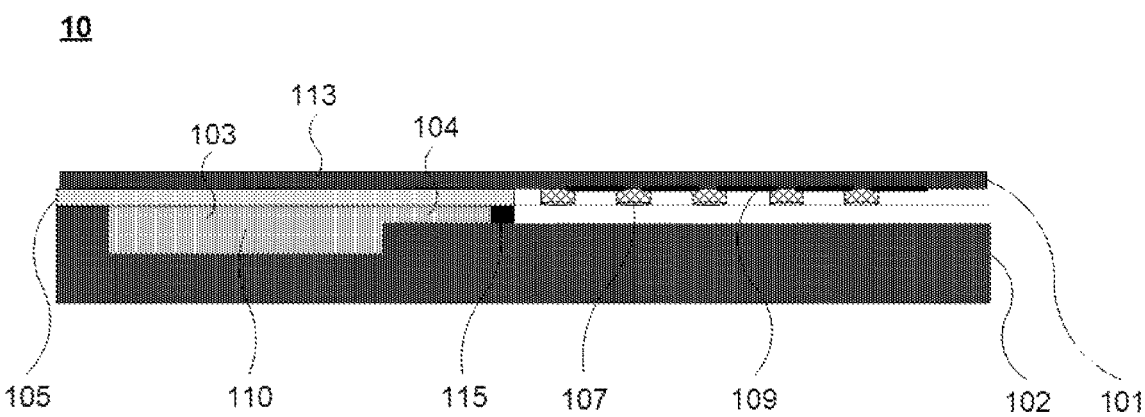
FIG. 8 is a schematic structural sectional diagram of another capillary channel environmental sensor provided by an embodiment of the present invention.

Based on the foregoing embodiments, FIG. 8 is a schematic structural sectional diagram of another capillary channel environmental sensor provided by an embodiment of the present invention. As shown in FIG. 8, in the capillary channel environmental sensor 10 provided by the embodiment of the present invention, the surface of one side of the elastic transfer diaphragm 105 away from the transfer cavity 103 is provided with a rigid covering 113. As shown in FIG. 8, the rigid covering 113 completely covers the place between the elastic transfer diaphragm 105 and the external environment in the capillary channel environmental sensor 10. In this way, the displacement of the elastic transfer diaphragm 105 is affected only by the change in volume of the transfer medium caused by the temperature, but is insusceptible to the external pressure, vibration, and acoustic wave. Such a design is used for measurement of the ambient temperature, such that the capillary channel environmental sensor can implement the measurement of the ambient temperature, thus enlarging the measurement scope of the capillary channel environmental sensor.

Figure 9:
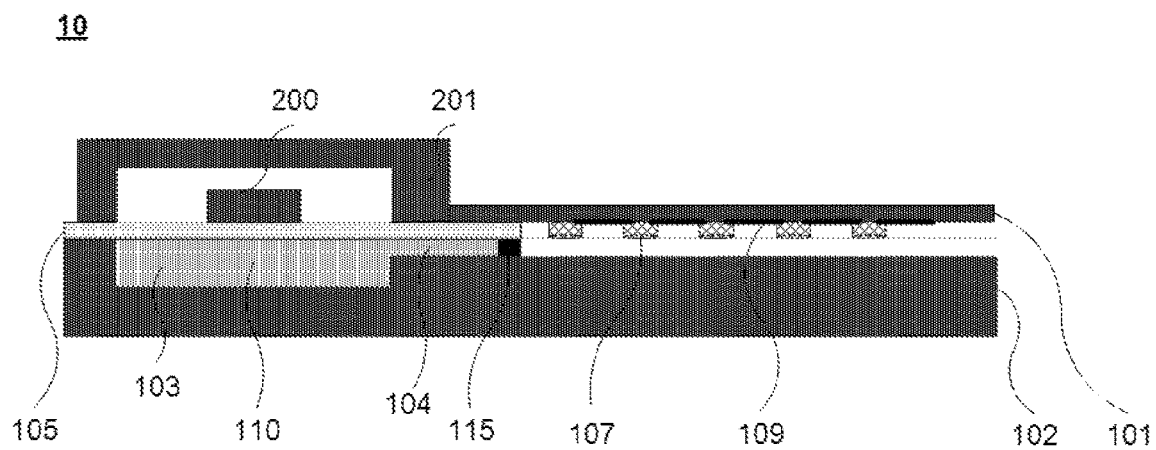
FIG. 9 is a schematic structural sectional diagram of another capillary channel environmental sensor provided by an embodiment of the present invention.
Figure 10:
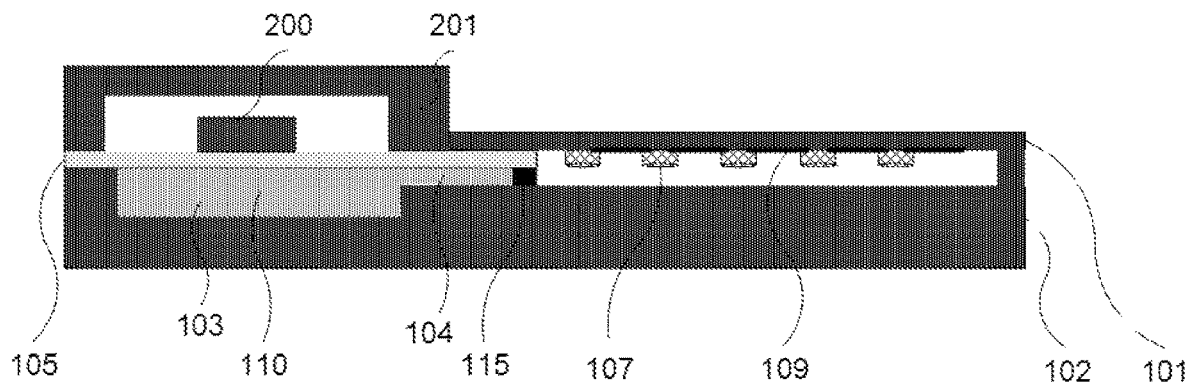
FIG. 10 is a schematic structural sectional diagram of another capillary channel environmental sensor provided by an embodiment of the present invention.

Based on the foregoing embodiments, FIG. 9 is a schematic structural sectional diagram of another capillary channel environmental sensor provided by an embodiment of the present invention; and FIG. 10 is a schematic structural sectional diagram of another capillary channel environmental sensor provided by an embodiment of the present invention. As shown in FIGS. 9 and 10, in the capillary channel environmental sensor 10 provided by the embodiment of the present invention, an evacuated enclosure 201 is disposed at one side of the elastic transfer diaphragm 105 away from the transfer cavity 103. The evacuated enclosure 201 and the elastic transfer diaphragm 105 form a closed cavity, where the closed cavity is a vacuum-sealed cavity or a sealed cavity with a known reference pressure. A mass block 200 is disposed in the closed cavity and located on the surface of the elastic transfer diaphragm 105; or the closed cavity is filled with a counterweight liquid (not shown in the figures). FIG. 9 illustrates an example in which one end of the capillary channel 104 communicated with the measurement environment is open, while FIG. 10 illustrates an example in which one end of the capillary channel 104 communicated with the measurement environment is closed. Further, both FIGS. 9 and 10 illustrate an example in which the mass block 200 is disposed inside the closed cavity. As shown in FIGS. 9 and 10, in order to enhance the response of the elastic transfer diaphragm 105 to the inertial parameters, a mass block 200 and an evacuated enclosure 201 may be disposed above the elastic transfer diaphragm 105, and a cavity enclosed by the evacuated enclosure 201 and the elastic transfer diaphragm 105 is vacuum-sealed or is provided to have a known reference pressure, so as to eliminate the influence caused by the change in external pressure. Thus, the capillary channel environmental sensor can implement measurement of the inertial parameters, enlarging the measurement scope of the capillary channel environmental sensor.

Figure 11:
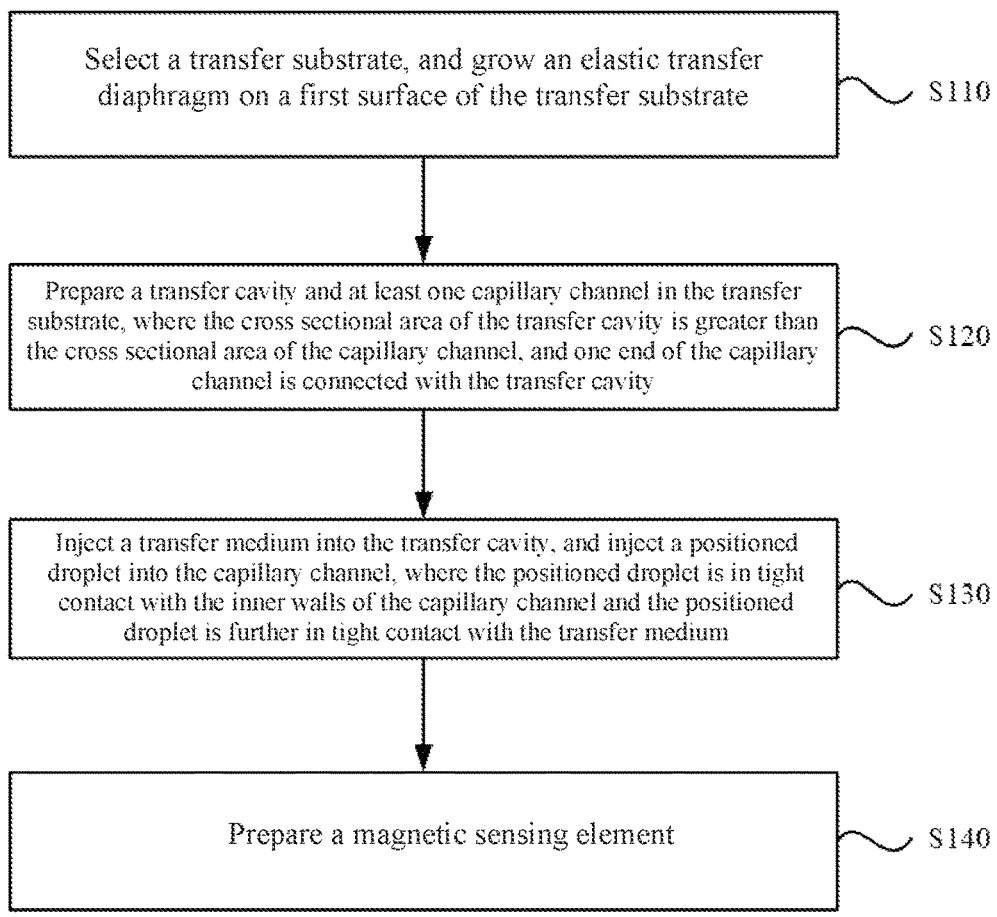
FIG. 11 is a schematic flowchart of a preparation method of a capillary channel environmental sensor provided by an embodiment of the present invention.

Based on the same invention concept, an embodiment of the present invention further provides a preparation method of a capillary channel environmental sensor, for use in preparing the capillary channel environmental sensor described in the foregoing embodiments of the present invention. Specifically, FIG. 11 is a schematic flowchart of a preparation method of a capillary channel environmental sensor provided by an embodiment of the present invention. As shown in FIG. 11, the preparation method of the capillary channel environmental sensor provided by the embodiment of the present invention includes the following steps:

S110. A transfer substrate is selected, and an elastic transfer diaphragm is grown on a first surface of the transfer substrate.

Exemplarily, the elastic transfer diaphragm may be grown on a first surface of a complete transfer substrate by means of thermal oxidation or deposition.

S120. A transfer cavity and at least one capillary channel are prepared in the transfer substrate, where the cross sectional area of the transfer cavity is greater than the cross sectional area of the capillary channel, and one end of the capillary channel is connected with the transfer cavity.

Exemplarily, on the first surface of the transfer substrate, namely, at the side where the elastic transfer diaphragm is grown, the elastic transfer diaphragm and the transfer substrate are etched to prepare at least one capillary channel, where the depth of the capillary channel is greater than the thickness of the elastic transfer diaphragm and the bottom portion of the capillary channel is located in the transfer substrate.

On a second surface of the transfer substrate, the transfer substrate is etched to prepare the transfer cavity, where the transfer cavity ends at a lower surface of the elastic transfer diaphragm and the transfer cavity is connected with the capillary channel.

S130. A transfer medium is injected into the transfer cavity, and a positioned droplet is injected into the capillary channel, where the positioned droplet is in tight contact with the inner walls of the capillary channel and the positioned droplet is further in tight contact with the transfer medium.

S140. A magnetic sensing element is prepared.

In the preparation method of the capillary channel environmental sensor provided by the embodiment of the present invention, the mutually communicated transfer cavity and capillary channel are prepared in the transfer substrate, and further the cross sectional area of the transfer cavity is prepared to be larger than that of the capillary channel. Thus, based on Pascal's principle and by means of the difference in volume between the transfer cavity and the capillary channel, a small displacement in a region of large volume is transformed into a large displacement in a region of small volume, and the large displacement can be conducted to the capillary channel. Moreover, the positioned droplet and the magnetic sensing element are prepared in the capillary channel. In this way, based on the movement of the positioned droplet, a change in displacement can be converted into a change in resistance value through an intermediate variable, such as the magnetic field variation. Thus, by means of the characteristics of high sensitivity and low power consumption of the magnetic sensing element, single-chip manufacturing of environmental parameter sensors, such as the ambient temperature sensor, pressure sensor, displacement sensor, vibration sensor and acoustic wave sensor, can be implemented in the same process, facilitating integration and miniaturization of the environmental sensor and further ensuring high SNR and low power consumption of the sensor.

The preparation method of the capillary channel environmental sensor provided by the embodiment of the present invention is described in detail below with reference to an actual preparation process.

Figure 12:
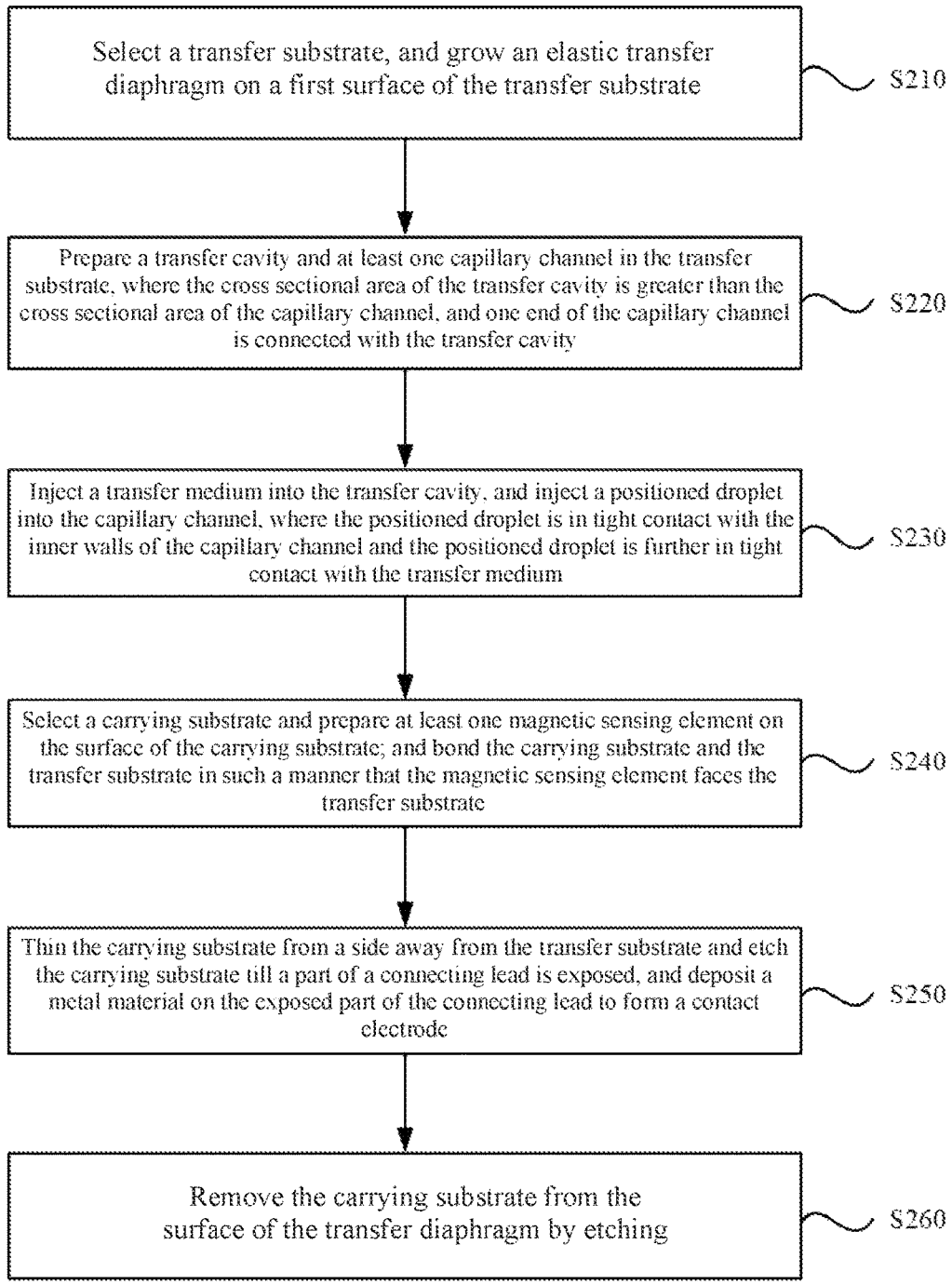
FIG. 12 is a schematic flowchart of a preparation method of another capillary channel environmental sensor provided by an embodiment of the present invention.

FIG. 12 is a schematic flowchart of a preparation method of another capillary channel environmental sensor provided by an embodiment of the present invention. As shown in FIG. 12, the preparation method of the capillary channel environmental sensor provided by the embodiment of the present invention may include the following steps:

S210. A transfer substrate is selected, and an elastic transfer diaphragm is grown on a first surface of the transfer substrate.

Figure 13:
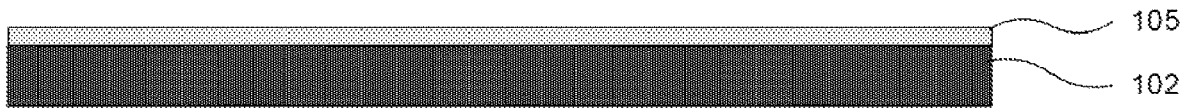
FIGS. 13 to 20 are diagrams of specific preparation processes of steps in the preparation method corresponding to FIG. 12.

As shown in FIG. 13, an elastic transfer diaphragm 105 is grown on a first surface of a complete transfer substrate 102.

S220. A transfer cavity and at least one capillary channel are prepared in the transfer substrate, where the cross sectional area of the transfer cavity is greater than that of the capillary channel, and one end of the capillary channel is connected with the transfer cavity.

Figure 14:
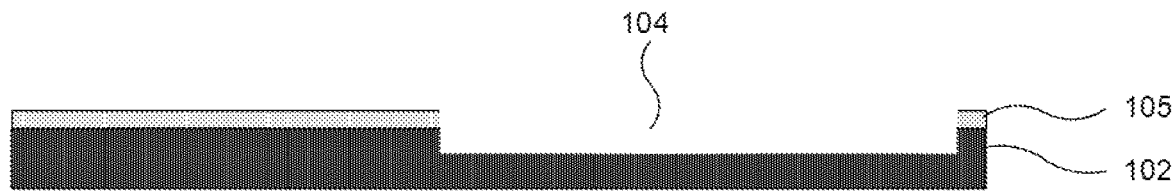

As shown in FIG. 14, on the first surface of the transfer substrate 1020, namely, at the side where the elastic transfer diaphragm 105 is grown, the elastic transfer diaphragm 105 and the transfer substrate 102 are etched to prepare at least one capillary channel 104, where the depth of the capillary channel 104 is greater than the thickness of the elastic transfer diaphragm 105 and the bottom portion of the capillary channel is located in the transfer substrate 102.

Figure 15:
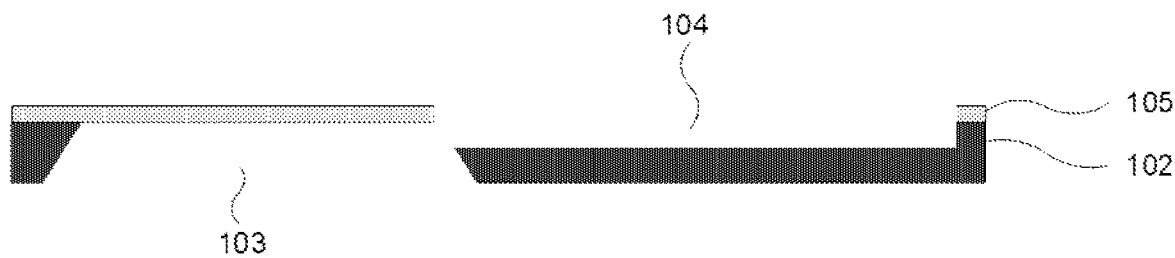

As shown in FIG. 15, a second surface of the transfer substrate 102 is etched to prepare a transfer cavity 103. The transfer cavity 103 penetrates through the transfer substrate 102, that is, the transfer cavity 103 ends at a lower surface of the elastic transfer diaphragm 105 and the transfer cavity 103 is connected with the capillary channel 104. The second surface of the transfer substrate is disposed opposite to the first surface.

S230. A transfer medium is injected into the transfer cavity, and a positioned droplet is injected into the capillary channel, where the positioned droplet is in tight contact with the inner walls of the capillary channel and is further in tight contact with the transfer medium.

Specifically, the step of injecting a transfer medium into the transfer cavity may include:

selecting an auxiliary wafer;

bonding the auxiliary wafer to the second surface of the transfer substrate to obtain the transfer cavity, where the second surface is disposed opposite to the first surface; and injecting the transfer medium into the transfer cavity.

Figure 16:
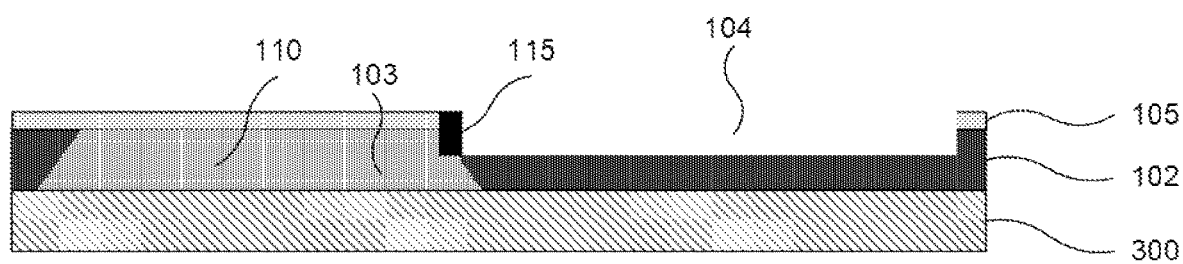

As shown in FIG. 16, an auxiliary wafer 300 is selected, and is bonded to the second surface of the transfer substrate 102, to obtain the transfer cavity 103. The transfer medium is injected into the transfer cavity 103, and the positioned droplet 115 is injected into the capillary channel 104, where the positioned droplet 115 is in tight contact with the inner walls of the capillary channel 104 and is further in tight contact with the transfer medium.

S240. A carrying substrate is selected and at least one magnetic sensing element is prepared on the surface of the carrying substrate, and the carrying substrate and the transfer substrate are bonded in such a manner that the magnetic sensing element faces the transfer substrate.

Figure 17:
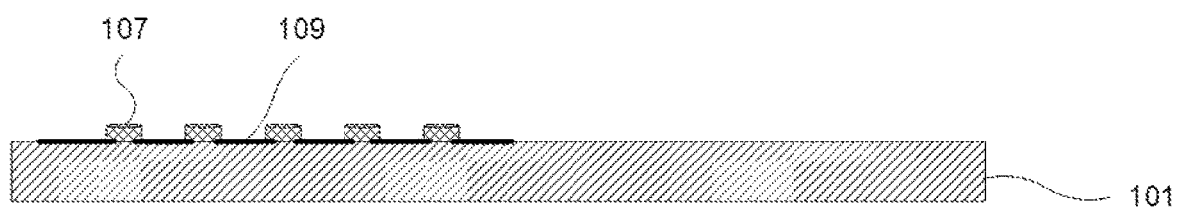

As shown in FIG. 17, a carrying substrate 101 is selected and an induction material film is deposited on the surface of the carrying substrate 101, and a magnetic sensing element 107 and a connecting lead 109 are formed by photolithography. Afterwards, a passivation layer (not shown in the figure) is prepared at one side of the magnetic sensing element 107 away from the carrying substrate 101, and is used for passivation protection for the magnetic sensing element 107.

Figure 18:
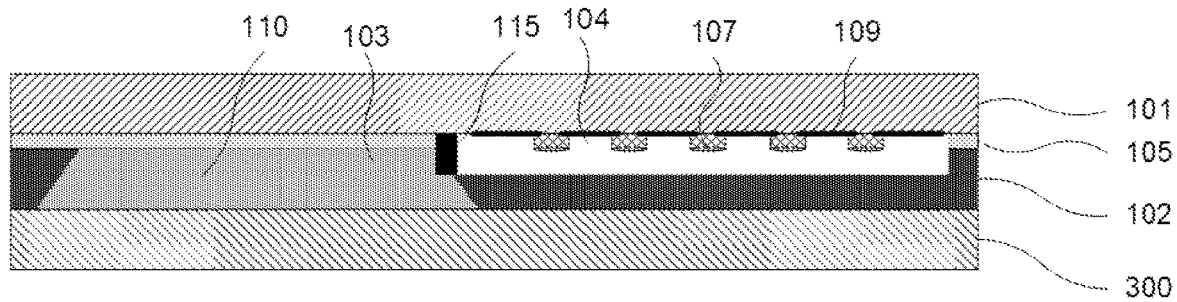

As shown in FIG. 18, the carrying substrate 101 and the transfer substrate 102 are bonded in such a manner that the magnetic sensing element 107 faces the transfer substrate 102, to obtain at least one magnetic sensing element 107.

S250. The carrying substrate is thinned from one side away from the transfer substrate and is etched till a part of the connecting lead is exposed, and a metal material is deposited on the exposed part of the connecting lead to form a contact electrode.

Figure 19:
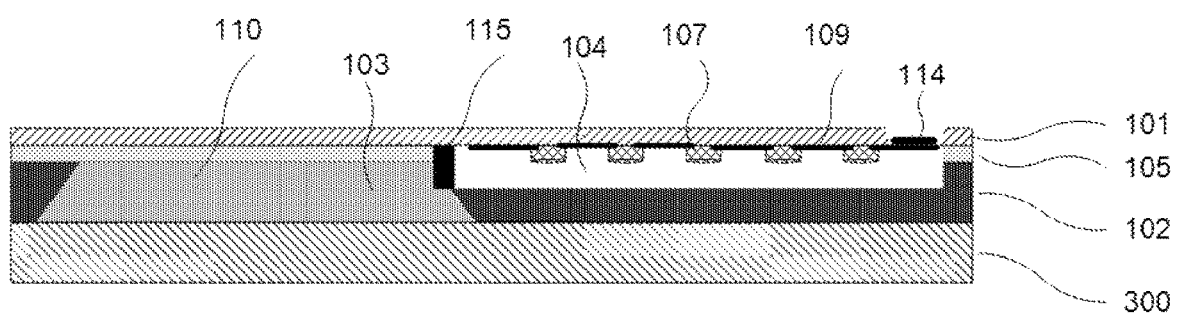

As shown in FIG. 19, the carrying substrate 101 is thinned from one side away from the transfer substrate 102 and is etched till a part of the connecting lead 109 is exposed, and a metal material is deposited on the exposed part of the connecting lead 109 to form a contact electrode 114.

In this way, a micromotor environmental sensor capable of measurement of the ambient temperature can be obtained.

S260. The carrying substrate is removed from the surface of the transfer diaphragm by etching.

Figure 20:
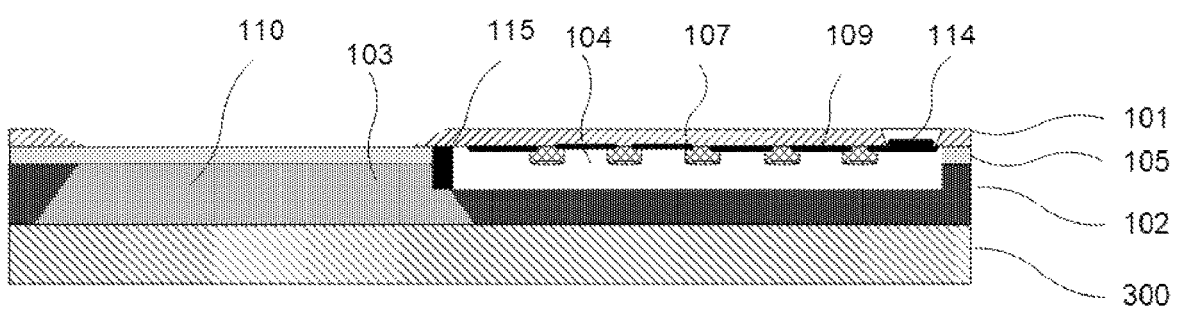

As shown in FIG. 20, the carrying substrate 101 is removed from the surface of the elastic transfer diaphragm 105 by etching, to obtain a capillary channel environmental sensor. The capillary channel environmental sensor obtained herein can realize measurement of environmental parameters such as the pressure, displacement, vibration, and acoustic waves.

To sum up, the foregoing embodiment describes the preparation method of the capillary channel environmental sensor in detail from the perspective of an actual preparation process, such that the prepared capillary channel environmental sensor can implement single-chip manufacturing of environmental parameter sensors, such as the ambient temperature sensor, pressure sensor, displacement sensor, vibration sensor and acoustic wave sensor, thus facilitating integration and miniaturization of the environmental sensor and further ensuring high SNR and low power consumption of the sensor.

Based on the foregoing embodiment, the preparation method of the capillary channel environmental sensor provided by the embodiment of the present invention further includes preparation of a signal transformation material.

Specifically, the signal transformation material includes a magnetic material.

The preparation of the signal transformation material may include preparation of the magnetic material in the transfer cavity, where the magnetic material is disposed in the transfer medium or in the positioned droplet.

Alternatively, the signal transformation material includes a non-magnetic metal material and an excitation coil.

The preparation of the signal transformation material may include preparation of the non-magnetic metal material in the transfer cavity or in the positioned droplet, where the non-magnetic metal material is disposed in the transfer medium or in the positioned droplet.

The excitation coil is prepared on the transfer substrate, and the excitation coil is loaded with a radio frequency AC current, which is used to drive the non-magnetic metal material to generate an induced eddy current, thus resulting in an induced magnetic field.

In the capillary channel environmental sensor provided in the embodiment of the present invention, the signal transformation material may include different forms, and accordingly, the preparation method also corresponds to different processes. The magnitude of change of the intermediate variable can be increased by additional disposition of the signal transformation material, thereby improving the sensitivity of the capillary channel environmental sensor.

Based on the foregoing embodiments, the preparation method of the capillary channel environmental sensor provided by the embodiment of the present invention further includes preparation of a mass block and an evacuated enclosure at one side of the elastic transfer diaphragm away from the transfer cavity. The evacuated enclosure and the elastic transfer diaphragm form a closed cavity, where the closed cavity is a vacuum-sealed cavity or a sealed cavity with a known reference pressure, and the mass block is disposed in the evacuated enclosure. Alternatively, the evacuated enclosure is prepared at one side of the elastic transfer diaphragm away from the transfer cavity. The evacuated enclosure and the elastic transfer diaphragm form a closed cavity, where the closed cavity is a vacuum-sealed cavity or a sealed cavity with a known reference pressure, and the closed cavity is filled with a counterweight liquid. By arrangement of the evacuated enclosure and by disposition of the mass block or counterweight liquid in the evacuated enclosure, the capillary channel environmental sensor can implement measurement of the inertial parameters, thus enlarging the measurement scope of the capillary channel environmental sensor.

It should be noted that, the above only describes the preferred embodiments of the present invention and the applied technical principles. Those skilled in the art can understand that the present invention is not limited to the specific embodiments described herein. Features of various embodiments of the present invention may be coupled or combined with each other in part or in whole, and may cooperate with each other and be technically driven in various ways. For those skilled in the art, various obvious changes, readjustments, combinations, and substitutions can be made without departing from the protection scope of the present invention. Therefore, although the present invention has been described in detail through the above embodiments, the present invention is not limited to the above embodiments. The present invention may further include other equivalent embodiments without departing from the concept of the present inventive, and the scope of the present invention is defined by the scope of the appended claims.

The invention claimed is:

1. A capillary channel environmental sensor, comprising a transfer substrate and at least one magnetic sensing element, wherein
   a transfer cavity and at least one capillary channel are provided inside the transfer substrate, a cross sectional area of the transfer cavity being greater than a cross sectional area of the capillary channel, and one end of the capillary channel being connected with the transfer cavity;
   an elastic transfer diaphragm is provided between the transfer cavity and an external measurement environment, and a transfer medium is provided inside the transfer cavity; and
   a positioned droplet is provided in an interior of the capillary channel, the positioned droplet being in tight contact with inner walls of the capillary channel and the positioned droplet being further in tight contact with the transfer medium.

2. The capillary channel environmental sensor according to claim 1, wherein a first minimum distance from the magnetic sensing element to the capillary channel is less than a second minimum distance from the magnetic sensing element to the elastic transfer diaphragm.

3. The capillary channel environmental sensor according to claim 1, wherein the capillary channel environmental sensor further comprises a signal transformation material, at least part of the signal transformation material being disposed in the transfer medium or the signal transformation material being disposed in the positioned droplet; and the positioned droplet comprises mercury, a magnetic fluid, or a hydrophobic organic liquid that is able to generate an induced magnetic field based on a flow of the positioned droplet.

4. The capillary channel environmental sensor according to claim 3, wherein the signal transformation material comprises a magnetic material, the magnetic material being disposed in the transfer medium or in the positioned droplet; or
   the signal transformation material comprises a non-magnetic metal material and an excitation coil, the non-magnetic metal material being disposed in the transfer medium or in the positioned droplet, and the excitation coil being disposed on the transfer substrate; and the excitation coil is loaded with a radio frequency AC current, which is used to drive the non-magnetic metal material to generate an induced eddy current, thus resulting in an induced magnetic field.

5. The capillary channel environmental sensor according to claim 1, wherein one end of the capillary channel that is communicated with the external measurement environment is closed.

6. The capillary channel environmental sensor according to claim 1, wherein the magnetic sensing element comprises one of anisotropic magnetoresistance, giant magnetoresistance, tunnel junction magnetoresistance, and Hall elements.

7. The capillary channel environmental sensor according to claim 1, wherein the capillary channel environmental sensor further comprises: a connecting lead and a contact electrode that are located at a first side of the magnetic sensing element, and a passivation layer located at a second side of the magnetic sensing element, the first side and the second side being disposed opposite to each other; and the connecting lead and the magnetic sensing element are electrically connected, and the contact electrode and the connecting lead are electrically connected.

8. The capillary channel environmental sensor according to claim 1, wherein a surface of one side of the elastic transfer diaphragm away from the transfer cavity is provided with a rigid covering.

9. A preparation method of a capillary channel environmental sensor, for use in preparing the a capillary channel environmental sensor of claim 1, wherein the preparation method comprises:
selecting the transfer substrate, and growing the elastic transfer diaphragm on a first surface of the transfer substrate;
preparing the transfer cavity and the at least one capillary channel in the transfer substrate;
injecting the transfer medium into the transfer cavity, and injecting the droplet into the capillary channel; and
preparing the at least one magnetic sensing element.

10. The preparation method according to claim 9, wherein the preparing the transfer cavity and the at least one capillary channel in the transfer substrate comprises:
etching the elastic transfer diaphragm and the transfer substrate to prepare at least one capillary channel, wherein a depth of the capillary channel is greater than a thickness of the elastic transfer diaphragm; and
etching a second surface of the transfer substrate to obtain the transfer cavity, wherein the transfer cavity penetrates through the transfer substrate and the transfer cavity is connected with the capillary channel; and the second surface is disposed opposite to the first surface.

11. The preparation method according to claim 9, wherein the preparing the at least one magnetic sensing element comprises:
selecting a carrying substrate and preparing at least one magnetic sensing element on the surface of the carrying substrate; and
bonding the carrying substrate and the transfer substrate in such a manner that the magnetic sensing element faces the transfer substrate; and
the preparation method further comprises:
removing the carrying substrate from the surface of the transfer diaphragm by etching.

12. The preparation method according to claim 11, wherein the preparing the at least one magnetic sensing element on the surface of the carrying substrate comprises:
depositing an induction material film on the surface of the carrying substrate, and forming the at least one magnetic sensing element and a connecting lead by photolithography; and
preparing a passivation layer at one side of the magnetic sensing element away from the carrying substrate; and
after the preparing at least one magnetic sensing element on the surface of the carrying substrate, the method further comprises:
thinning the carrying substrate from one side away from the transfer substrate and etching the carrying substrate till a part of the connecting lead is exposed, and depositing a metal material on the exposed part of the connecting lead to form a contact electrode.

13. The preparation method according to claim 9, wherein the injecting the transfer medium into the transfer cavity comprises:
selecting an auxiliary wafer;
bonding the auxiliary wafer to a second surface of the transfer substrate to obtain the transfer cavity, wherein the second surface is disposed opposite to the first surface; and
injecting the transfer medium into the transfer cavity.

14. A capillary channel environmental sensor, comprising a transfer substrate and at least one magnetic sensing element, wherein
a transfer cavity and at least one capillary channel are provided inside the transfer substrate, a cross sectional area of the transfer cavity being greater than a cross sectional area of the capillary channel, and one end of the capillary channel being connected with the transfer cavity;
an elastic transfer diaphragm is provided between the transfer cavity and an external measurement environment, and a transfer medium is provided inside the transfer cavity;
a positioned droplet is provided in an interior of the capillary channel, the positioned droplet being in tight contact with inner walls of the capillary channel and the positioned droplet being further in tight contact with the transfer medium;
an evacuated enclosure is disposed at one side of the elastic transfer diaphragm away from the transfer cavity, the evacuated enclosure and the elastic transfer diaphragm forming a closed cavity, the closed cavity being a vacuum-sealed cavity or a sealed cavity with a known reference pressure; and
a mass block is disposed in the closed cavity, the mass block being located on a surface of the elastic transfer diaphragm; or the closed cavity is filled with a counterweight liquid.

* * * * *